(12) United States Patent
Zhu

(10) Patent No.: US 11,291,272 B2
(45) Date of Patent: Apr. 5, 2022

(54) METHOD FOR MANUFACTURING WATERPROOF AND BREATHABLE SHOES, AND SHOE UPPER STRUCTURE OF WATERPROOF AND BREATHABLE SHOES

(71) Applicant: Xiaoying Zhu, Jiaxing (CN)

(72) Inventor: Xiaoying Zhu, Jiaxing (CN)

( * ) Notice: Subject to any disclaimer, the term of this patent is extended or adjusted under 35 U.S.C. 154(b) by 77 days.

(21) Appl. No.: 17/058,135

(22) PCT Filed: Apr. 25, 2018

(86) PCT No.: PCT/CN2018/084329
§ 371 (c)(1),
(2) Date: Nov. 24, 2020

(87) PCT Pub. No.: WO2018/196764
PCT Pub. Date: Nov. 1, 2018

(65) Prior Publication Data
US 2021/0244137 A1    Aug. 12, 2021

(30) Foreign Application Priority Data

Apr. 27, 2017   (CN) .......................... 201710284788.7

(51) Int. Cl.
*A43D 25/047*   (2006.01)
*A43B 23/02*    (2006.01)
(Continued)

(52) U.S. Cl.
CPC ........ *A43D 25/047* (2013.01); *A43B 23/0235* (2013.01); *A43B 23/0255* (2013.01);
(Continued)

(58) Field of Classification Search
USPC .......... 12/146 B, 146 C, 144 R; 36/3 A, 3 B; 442/304, 318
See application file for complete search history.

(56) References Cited

U.S. PATENT DOCUMENTS 6,848,202 B2   2/2005  Berggren
7,823,297 B2   11/2010 Polegato Moretti
(Continued)

FOREIGN PATENT DOCUMENTS

CN        2689743 Y    4/2005
CN      101594797 A   12/2009
(Continued)

OTHER PUBLICATIONS

International Search Report of PCT/CN2018/084329, dated Jul. 20, 2018.

*Primary Examiner* — Lynda Salvatore
(74) *Attorney, Agent, or Firm* — True Shepherd LLC; Andrew C. Cheng

(57) ABSTRACT

A method for manufacturing waterproof and breathable shoes is provided. The method includes subjecting shoe sole materials to plastication and mixing, followed by cutting into pieces to be mold to form a shoe sole; stacking a knitted fabric as an outer layer, a polyurethane layer as a middle layer, and a knitted fabric as an inner layer sequentially into a mold for hot-pressing and shaping to form a shoe upper; and bonding the shoe upper to the shoe sole with an adhesive glue so as to form a shoe. The shoe is made flexible and light as the shoe upper is made up of two layers of knitted fabric bonded to a polyurethane layer. Moreover, the middle layer of the shoe upper includes a wavy structure, which is stretchable and helps improve waterproofness and breathability of the shoe upper.

3 Claims, 1 Drawing Sheet

(51) Int. Cl.
- *B29D 35/14* (2010.01)
- *B32B 3/28* (2006.01)
- *B32B 5/02* (2006.01)
- *B32B 7/14* (2006.01)
- *B32B 27/12* (2006.01)
- *B32B 27/40* (2006.01)
- *D06N 3/00* (2006.01)
- *D06N 3/14* (2006.01)

(52) U.S. Cl.
CPC ......... *B29D 35/142* (2013.01); *B29D 35/146* (2013.01); *B32B 3/28* (2013.01); *B32B 5/026* (2013.01); *B32B 7/14* (2013.01); *B32B 27/12* (2013.01); *B32B 27/40* (2013.01); *D06N 3/0009* (2013.01); *D06N 3/14* (2013.01); *B32B 2437/02* (2013.01); *D06N 2203/068* (2013.01); *D06N 2211/106* (2013.01)

(56) References Cited

U.S. PATENT DOCUMENTS

| | | | |
|---|---|---|---|
| 9,585,435 | B2 | 3/2017 | Bier et al. |
| 2013/0291400 | A1* | 11/2013 | Rammig ............ A43B 23/0255 36/45 |

FOREIGN PATENT DOCUMENTS

| | | | | | |
|---|---|---|---|---|---|
| CN | 101691696 | A | | 4/2010 | |
| CN | 201905277 | U | | 7/2011 | |
| CN | 102573544 | A | | 7/2012 | |
| CN | 103381002 | | * | 11/2013 | ......... A43B 23/0235 |
| CN | 103381002 | A | | 11/2013 | |
| CN | 104886833 | A | | 9/2015 | |
| CN | 105193009 | | * | 12/2015 | ........... A43D 25/047 |
| CN | 105193009 | A | | 12/2015 | |
| CN | 105837870 | A | | 8/2016 | |
| CN | 107048603 | A | | 8/2017 | |
| DE | 1469474 | A1 | | 2/1970 | |

* cited by examiner

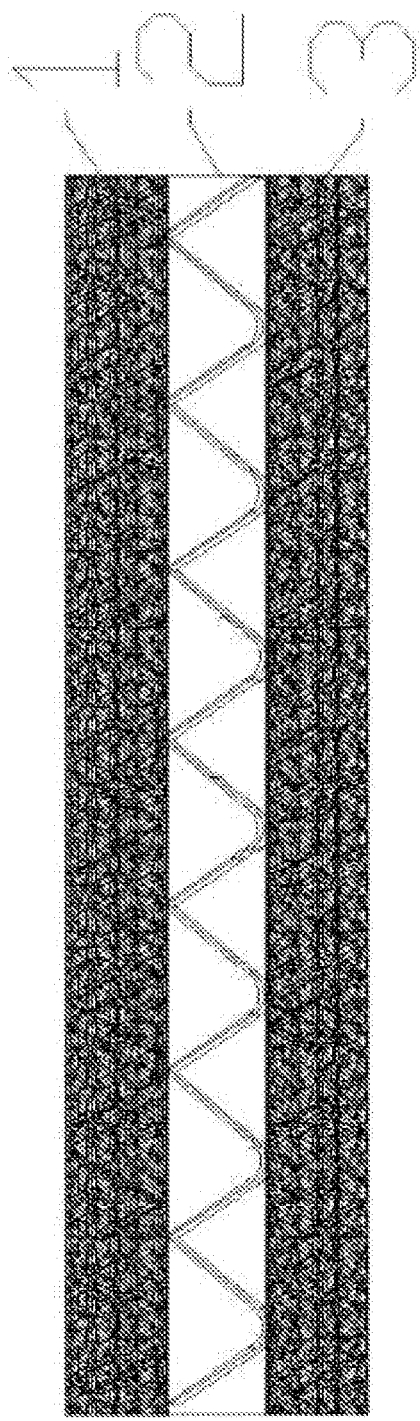

METHOD FOR MANUFACTURING WATERPROOF AND BREATHABLE SHOES, AND SHOE UPPER STRUCTURE OF WATERPROOF AND BREATHABLE SHOES

TECHNICAL FIELD

The present disclosure specifically relates to a method for manufacturing, waterproof and breathable shoes, and a shoe upper structure of the waterproof and breathable shoes.

BACKGROUND OF THE PRESENT INVENTION

In competitive games or sports for leisure, our feet have direct or indirect contact with the outside world, and feet health is extremely important. Therefore, the protection of our feet has received wider attention. As the most important outfit for foot protection, shielding shoes must function properly. Due to different special characteristics of different sports, it is necessary to design waterproof and breathable shoes in a targeted manner, so there are waterproof and breathable shoes with different structures and varying functions. As sports become a fashion and more and more important today, the wearing rate of waterproof and breathable shoes is also increasing. Moreover, requirements for the manufacture of shoes are getting higher and higher.

At present, there, are many problems in the processing of footwear products, such as complicated processing steps, high labor cost, and heavy environmental pollution caused by some chemical raw materials during processing. Therefore, there is an urgent need for products with a high degree of forming to replace traditional products. Flat-knitted shoe upper material (hereinafter referred to as flat-knitted shoe upper) is a shoe upper product produced by flat knitting technology, which is lightweight and breathable and also has a high degree of product formation. The shoe upper, knitted with color yarns, can present a variety of colors, stitches and patterns without dyeing and shaping, and the whole body of the shoe upper has no abutted seams. It is an effective means to reduce processing procedures, alleviate environmental pollution, and improve the integrity of products.

SUMMARY OF PRESENT INVENTION

Technical Problems

All kinds of well-known lightweight shoes are made of a shoe sole and a shoe upper that is made from various durable woven fabrics and other, light, natural or synthetic materials by cutting and stitching. In order to improve the efficiency of shoe upper processing and the portability of a shoe upper in use, the current trend of shoe manufacturing is to, develop knitted shoe upper materials. Since shoes with knitted shoe uppers do not have waterproof function, their use in outdoor environments such as rainy or wading is greatly reduced. After shoes with knitted shoe uppers get wet or filled with water, people will feel uncomfortable, and feet, if continue to be exercised, will suffer from blisters. However, the existing waterproof shoe processing technology is to add a durable but relatively-heavy sewn waterproof shoe cover to an interlayer of the shoe upper, which will make shoes lose the portability.

Technical Solution

The present disclosure provides a method for manufacturing waterproof and breathable shoes, including: manufacturing of a shoe sole, manufacturing of a shoe upper, and bonding of the shoe upper and sole. The manufacturing method includes the following specific steps:

S1: manufacturing of the shoe sole: plasticating shoe sole materials using an open mill, separately; rolling the shoe sole materials by a roller for 1 to 2 times, separately; mixing the shoe sole materials for 5 min to 8 min at 55° C. to 65° C.; after the mixing, cutting into pieces using a cutting machine according to set requirements; placing obtained pieces at room temperature for 24 h; and conducting compression molding to obtain a shoe sole for the waterproof and breathable shoes;

S2: manufacturing of the shoe upper: knitting a sock knitted fabric from a yarn using a sock knitting machine; during the knitting process, weft-knitting a tuck stitch on a side at a connection of a sock upper and a sock sole of the sock knitted fabric and on an upper surface of the sock sole to obtain a semi-finished shoe upper, wherein, tucking is continuously conducted 4 times in the tuck stitch; the tuck stitch enables a more compact structure of the knitted fabric, prevents outward expansion and deformation of the shoe upper that compromises the wearing comfort, and enhances the waterproofness of an interface between the shoe sole and the shoe upper without affecting the lightweight performance of the shoe upper; and weft-knitting the tuck stitch on the upper surface of the sock sole of the sock knitted fabric can avoid an uneven sock opening caused by attachment of the knitted fabric to a die and prevent from affecting the quality of the shoe upper structure; stacking a knitted fabric as an outer layer, a polyurethane (PUTS) layer coated with glue dots on both sides, and a knitted fabric as an inner layer sequentially into a molding die in a nested fashion; placing the molding die in a hot press for hot-pressing and shaping at 120° C. to 150° C. for 1 min to 2 min; and cooling to obtain an integrated shoe upper for the waterproof and breathable shoes; and S3: bonding of the shoe upper and sole: bonding the shoe upper and sole for the waterproof and breathable shoes with an adhesive glue according to a size; subjecting, an obtained structure to instantaneous stamping under a pressure of 50 MPa to 60 MPa and to standing; and removing excess glue to obtain the waterproof and breathable shoes.

Further, in step S2, the yarn used for knitting the shoe upper may be polyester, spandex, polyamide, nylon, a Thermoplastic polyurethanes (TPU)-coated thermal fuse, or a polyethylene (PE)-coated steel wire.

In step S2, after the semi-finished knitted shoe upper is obtained, the fabric may be pretreated as follows soaking the fabric in a 4% sodium hydroxide solution at 80° C.; adding an accelerating agent in the solution, and further soaking for 15 min; taking the fabric out, washing thoroughly, and drying at 50° C.; then soaking the dried fabric for 40 min in a 120° C. treatment solution with 45 mg/mL polypropylene (PP) and p-xylene; adding a butanone solution, and further soaking for 20 min; taking the fabric out, and rolling the fabric once on a rolling machine, with a pick-up ratio of 70% to 80%; and finally drying the fabric at 50° C. under vacuum for later use. After the fabric undergoes alkali weight-reduction, the wetting time of the fabric is, shortened. This is mainly because the fabric fibers become thinner, pits are formed on the surface of the fibers, and keratin voids of the fabric become larger. On this basis, after the pretreatment with PP, sites for chemical reaction of the treatment solution with the surface of the fabric fiber are increased. The PP microspheres attached to the surface of the fabric have a nanoscale diameter, and the surface of the fabric itself has a microscale roughness, thus presenting a micro-nano hierarchical composite structure. This hierarchical composite structure exhibits a significant impact on improvement of a contact angle, and also can reduce the adhesion of water droplets on the surface, thus greatly reducing a sliding angle. A finished cotton fabric has a contact angle with water greater than 150° achieving superhydrophobicity.

In the above pretreatment, the p-xylene and butanone have a volume ratio of 85%:15%. After butanone is added as a nonsolvent, solubility parameters of the mixed solvent will be changed, thus reducing the solubility of PP in the solvent. When 2-Butanone has a volume fraction greater than 15%, PP particles cannot be dissolved in the mixed solution.

Further, in step S2, a spacing among adjacent glue dots on an upper surface of the PUR layer may be controlled at 3±0.5 mm, and the dispensing volume may be controlled at 0.01±0.005 ml; a spacing among adjacent glue dots on a lower surface of the PUR layer may be controlled at 4±0.5 mm, and the dispensing volume may be controlled at 0.12±0.005 ml; and the glue dots on the upper surface of the PUR layer may be misaligned and complementary with that on the lower surface.

Further, in step S2, the hot press may adopt a bra hot-pressing and shaping die; a knitted fabric as an outer layer, a PUR layer, coated with glue dots on both sides, and a knitted fabric as an inner layer may be sequentially stacked into a molding die in a nested fashion; and the shaping of two shoe uppers may be completed at one time to improve production efficiency.

The present disclosure further provides a shoe upper structure of the waterproof and breathable shoes, including an outer layer, a middle layer and an inner layer. The middle layer has an area larger than that of the outer layer and the inner layer; both inner and outer surfaces of the middle layer are coated with glue dots; and the middle layer is disposed between the outer layer and the inner layer, and a resulting structure is subjected to one-step gluing and shaping by hot-pressing, which is simpler than the traditional process and enhances the waterproof and breathable performance of the shoe upper structure.

Further, the outer layer and the inner layer may be manufactured by knitting, and the middle layer may have a waterproof and breathable membrane structure and may be a PUR layer, which reduces the steps of manufacturing shoe uppers, lowers the production cost, and improves the wearing comfort.

Further, the middle layer may be arranged as a transverse wave telescopic structure. When the waterproof and breathable shoes are worn, the shoe uppers will be arched and bear a specified tension. The middle layer bears a tension smaller than that of the outer layer and the inner layer, so the waterproof performance is greatly weakened after the middle layer is stretched, thus compromising the overall hydrophobicity of the shoe upper. In the present disclosure, the telescopic structure of the middle layer is stretched out to protect the middle layer and ensure the waterproof and breathable performance of the waterproof and breathable shoes.

Further, the upper part of the wave structure may be arranged as a triangular zigzag, with a zigzag angle not more than 90°; and the lower part of the wave structure may be arranged as an arc shape. When our feet arch the shoe uppers, the middle layers are stretched out. When rainwater or water vapor penetrates the outer layer and contacts the middle layer, the advancing contact angle of water droplets on the middle layer is greater than 90°. Since the attraction force among water molecules is greater than that between water molecules and the PUR layer, the water droplets gather together and will not infiltrate the middle layer, and thus an additional capillary pressure faces away from the dry side of the fabric. However, the attractive force among water molecules is smaller than that between water molecules and the outer layer, the water droplets gradually infiltrate the outer layer. When hot air emitted by the feet is transferred to the middle layer through the inner layer that is attached to the lower side of the middle layer, as the air pressure in the waterproof and breathable shoes is greater than the ambient pressure, the hot air is pushed through the pores of the middle layer to the outer layer and finally separated from the shoe upper structure.

Further, a spacing among adjacent glue dots on an upper surface of the middle layer may be twice the diameter of the glue dots on the upper surface of the middle layer, and a spacing among adjacent glue dots on a lower surface of the middle layer may be twice the diameter of the glue dots on the lower surface of the middle layer, which ensures sufficient glue to achieve bonding and avoids reduction in softness, comfort and breathability of the shoe upper structure caused by impregnation of too-much glue into the upper and lower knitted fabric, layers.

Beneficial Effects

In summary, the present disclosure improves the process of manufacturing shoe uppers when making waterproof and breathable shoes. Knitted fabrics are modified by pretreatment to increase the roughness of the surface of the knitted fabrics and enhance the hydrophobicity of the knitted fabrics. A PUR layer is disposed between two knitted fabric layers, and the middle layer is manufactured into a wave telescopic structure through dispensing technology. The three-layer structure is constructed into a shoe upper structure by hot-pressing and shaping, and sides of the shoe upper are subjected to tucking, which reduces the steps of manufacturing shoe uppers and lowers the production cost. The shoes are as flexible and light as a pair of knitted socks when worn on feet, and can bring an excellent touch. Moreover, the telescopic middle layer further enhances the waterproofness and breathability of the shoe upper structure, thus making the waterproof and breathable shoes more comfortable and meeting the functional performance of conventional shoes.

DESCRIPTION OF THE DRAWINGS

FIG. 1 is a schematic view of the longitudinal section of the shoe upper structure according to the present disclosure.

DETAILED DESCRIPTION OF PREFERRED EMBODIMENTS

The present disclosure discloses a method for manufacturing waterproof and breathable shoes, including: manufacturing of a shoe sole, manufacturing of a shoe upper, and bonding of the shoe upper and sole. The manufacturing method includes the following specific steps:

Firstly, various shoe sole materials were plasticated using an open mill, separately; the shoe sole materials were rolled by a roller for 1 to 2 times, separately; the shoe sole materials mixed for 5 min to 8 min at 55° C. to 65° C.; after the mixing, a resulting product was cut into pieces using, a cutting machine according to set requirements; obtained pieces were placed at room temperature for 24 h; and compression molding was conducted to obtain a shoe sole for the waterproof and breathable shoes.

secondly, a sock knitted fabric was knitted from a PE-coated steel wire or TPU-coated thermal fuse using a sock knitting machine; and during the knitting process, a tuck stitch was weft-knitted on a side at a connection of a sock upper and a sock sole of the sock knitted fabric and on an upper surface of the sock sole to obtain a semi-finished shoe upper. Tucking was continuously conducted 4 times in, the tuck stitch; the tuck stitch was provided to enable a more compact structure of the knitted fabric, prevent outward expansion and deformation of the shoe upper that compromises the wearing comfort, and enhance the waterproofness of an interface between the shoe sole and the shoe upper without affecting the lightweight performance of the shoe upper; and the tuck stitch was weft-knitted on the upper surface of the sock sole of the sock knitted fabric to avoid an uneven sock opening caused by attachment of the knitted fabric to a die, and prevent from affecting the quality of the shoe tipper structure. A knitted fabric as an outer layer, a PLR layer coated with, glue dots on both sides, and a knitted fabric as an inner layer were sequentially stacked into, a molding die in a nested, fashion; and the molding die was placed in a hot press for hot-pressing and shaping at 120° C. to 150° C. for 1 min to 2 min, and then cooled to obtain an integrated shoe upper for the waterproof and breathable shoes. The hot press adopted a bra hot-pressing and shaping die, which could simultaneously press sandwich structures of two shoe uppers. No waste was generated during the process of manufacturing shoe uppers, which saved raw materials and reduced the production cost.

The yarn used for knitting the shoe upper may be polyester, spandex, polyamide, nylon, a TPU-coated thermal fuse, or a PE-coated steel wire.

During the above process, after the semi-finished knitted shoe upper was obtained, the fabric was pretreated as follows: the fabric was soaked in a 4% sodium hydroxide solution at 80° C.; an accelerating agent was added in the solution, and the fabric was further soaked for 15 miii; the fabric was taken out, washed thoroughly, and dried at 50° C.; then the dried fabric was soaked for 40 min in a 120° C. treatment solution with 45 mg/mL PP and p-xylene; a butanone solution was added, and the fabric was further soaked for 20 min, then taken out, and rolled once on a rolling machine, with a pick-up ratio of 70% to 80%; and finally, the fabric was dried at 50° C. under vacuum for later use. After the fabric underwent alkali weight-reduction, the wetting time of the fabric was shortened. This was mainly because the fabric fibers became thinner, pits were formed on the surface of the fibers, and keratin voids of the fabric became larger. On this basis, after the pretreatment with PP, sites for chemical reaction of the treatment solution with the surface of the fabric fiber were increased. The PP microspheres attached to the surface of the fabric had a nanoscale diameter, and the surface of the fabric itself had a microscale roughness, thus presenting a micro-nano hierarchical composite structure. This, hierarchical composite structure exhibited a significant impact on improvement of a contact angle, and also could reduce the adhesion of water droplets on the surface, thus greatly reducing a sliding angle. A finished cotton fabric had a contact angle with water greater than 150°, achieving superhydrophobicity.

A spacing among adjacent glue dots on an upper surface of the PUR layer may be controlled at 5±1 mm, and the dispensing volume may be controlled at 0.01±0.005 mL; and a spacing among adjacent glue dots on a lower surface of the PUR layer may be controlled at 6±1 mm, and the dispensing volume may be controlled at 0.12±0.005 mL. For example, a spacing among adjacent glue dots on an upper surface of the PUR layer may be controlled at 5 mm, and the dispensing volume may be controlled at 0.01 mL; a spacing among adjacent glue dots on a lower surface of the PUR layer may be controlled at 6 mm, and the dispensing volume may be controlled at 0.12 mL. The glue dots on the upper surface of the PUR layer may be misaligned and complementary with that on the lower surface, allowing the middle layer of the shoe upper structure to have a wave telescopic structure. When the waterproof and breathable shoes are worn, the shoe uppers will be arched and bear a specified tension. The middle layer bears a tension smaller than that of the outer layer and the inner layer, so the waterproof performance is greatly weakened after the middle layer is stretched, thus compromising the overall hydrophobicity of the shoe upper. In the present disclosure, the telescopic structure of the middle layer is stretched out to protect the middle layer and ensure the waterproof and breathable performance of the waterproof and breathable shoes.

Finally, the shoe upper and sole for the waterproof and breathable shoes were bonded with an adhesive glue according to a size; an obtained structure was subjected to instantaneous stamping under a pressure of 50 MPa to 60 MPa and then stood; and excess glue was removed to obtain waterproof and breathable shoes.

On the basis of this manufacturing process, the present disclosure also relates to waterproof and breathable shoes with a two-layer shoe upper structure that does, not include a middle PUR layer, and the shoes are manufactured by stitching together two knitted fabric layers that are knitted from yarns by a sock knitting machine or a computerized flat knitting machine and then bonding a resulting shoe upper with a shoe sole.

Moreover, the shoe upper structure of the waterproof and breathable shoes includes an outer layer 1, a middle layer 2 and an inner layer 3. The middle layer 3 has an area larger than that of the outer layer 1 and the inner layer 3; both inner and outer surfaces of the middle layer 2 are coated with glue dots; and the middle layer is disposed between the outer layer 1 and the inner layer 3, and a resulting structure is subjected to one-step gluing and shaping by hot-pressing.

Further, the outer layer and the inner layer may be manufactured by knitting, and the middle layer may have a waterproof and breathable membrane structure.

Further, the middle layer may be a PUR layer.

Further, the middle layer may be arranged as a transverse wave telescopic structure; the upper part of the wave structure may be arranged as a triangular zigzag, with a zigzag angle not more than 90°; and the lower part of the wave structure may be arranged as an arc shape. When our feet arch the shoe uppers, the middle layers are stretched out. When rainwater or water vapor penetrates the outer layer and contacts the middle layer, the advancing contact angle of water droplets on the middle layer is greater than 90°. Since the attraction force among water molecules is greater than that between water molecules and the PUR layer, a capillary pressure of the PUR layer faces away from the PUR layer, and the water droplets gather together and will not infiltrate the middle layer. So an additional capillary pressure faces away from the dry side of the fabric. However, the attractive force among water molecules is smaller than that between water molecules and the outer layer, the water droplets gradually infiltrate the outer layer. When hot air emitted by the feet is transferred to the middle layer through the inner layer that is attached to the lower side of the middle layer, as the air pressure in the waterproof and breathable shoes is greater than the ambient pressure, the hot air is pushed through, the pores of the middle layer to the outer layer and finally separated from the shoe upper structure.

Further, a spacing among adjacent glue dots on an upper surface of the middle layer may be twice the diameter of the glue dots on the upper surface of the middle layer, and a spacing among adjacent glue dots on a lower surface of the middle layer may be twice the diameter of the glue dots on the lower surface of the middle layer. For example, the spacing among adjacent glue dots on the upper surface of the middle layer is controlled at 5 mm, and glue dots on the upper surface of the middle layer have a diameter of 2.5 mm; and the spacing among adjacent glue dots on the upper surface of the middle layer is controlled at 6 mm, and glue dots on the upper surface of the middle layer have a diameter of 3 mm. It ensures sufficient glue to achieve bonding and avoids reduction in softness, comfort and breathability of the shoe upper structure caused by impregnation of too-much glue into the upper and lower knitted fabric layers.

It should be noted that the above description is only a preferred example of the present disclosure and is not intended to limit the present disclosure. Although the present disclosure has been described in detail with reference to the foregoing examples, those skilled in the art can still modify the technical solutions described in the foregoing examples, or equivalently substitute some of the technical features of the examples. Any modifications, equivalent substitutions, improvements, etc. within the spirit and principle of the present disclosure should fall within the protection scope of the present disclosure.

What is claimed is:

1. A method for manufacturing waterproof and breathable shoes, comprising: manufacturing of a shoe sole, manufacturing of a shoe upper, and bonding of the shoe upper and sole, wherein, the method comprises the following specific steps:
    S1: manufacturing of the shoe sole: plasticating shoe sole materials using an open mill, separately; rolling the shoe sole materials by a roller for 1 to 2 times, separately; mixing the shoe sole materials for 5 min to 8 min at 55° C. to 65° C.; after the mixing, cutting into pieces using a cutting machine; placing the pieces at room temperature for 24 h; and conducting compression molding to obtain a shoe sole for the waterproof and breathable shoes;
    S2: manufacturing of the shoe upper: stacking a first knitted fabric that serves as an outer layer, a polyurethane (PU) layer that is coated with glue dots on upper and lower surfaces of the polyurethane layer to serve as a middle layer, and a second knitted fabric that serves as an inner layer sequentially to form a nested arrangement that is disposed into a molding die; placing the molding die in a hot press for hot-pressing and shaping at 120° C. to 150° C. for 1 min to 2 min; and cooling to obtain an integrated shoe upper, wherein the hot press includes a hot-pressing and shaping die;
    S3: bonding of the shoe upper and sole: bonding the shoe upper and sole with an adhesive glue; subjecting an obtained structure to instantaneous stamping under a pressure of 50 MPa to 60 MPa and to standing; and removing excess glue to obtain a finished waterproof and breathable shoe;
    wherein the finished waterproof and breathable shoe comprises the shoe upper that is bonded to the sole, wherein the shoe upper includes a three-layer structure including the middle layer of polyurethane having a wavy configuration that is interposed between and adhesively bonded to the outer layer of first knitted fabric and an inner layer of second knitted fabric by means of the glue dots coated on the upper and lower surfaces of the middle layer, the middle layer being made of a material different from the inner and outer layers, and wherein for the finished waterproof and breathable shoe, the wavy configuration of the middle layer has a surface area that is greater than surface areas of the inner layer and the outer layer, and the wavy configuration includes an upper part arranged in a triangular zigzag having top tips adhesively bonded to the outer layer and a lower part having bottom tips arranged in an arc shape adhesively bonded to the inner layer, the top tips of the middle layer that are adhesively bonded to the outer layer being alternate with the bottom tips of the middle that are adhesively bonded to the inner layer.

2. The method according to claim 1, wherein, in step S2, a spacing among adjacent glue dots on the upper surface of the middle layer of polyurethane is controlled at 5±1 mm, and the dispensing volume is controlled at 0.01±0.005 ml; a spacing among adjacent glue dots on the lower surface of the middle layer of polyurethane layer is controlled at 6±1 mm, and the dispensing volume is controlled at 0.12±0.005 ml; and the glue dots on the upper surface of the middle layer of polyurethane are misaligned and complementary with those on the lower surface of the middle layer of polyurethane.

3. Waterproof and breathable shoes manufactured by the method of claim 1.

* * * * *